United States Patent
Reed

(10) Patent No.: US 6,572,315 B1
(45) Date of Patent: Jun. 3, 2003

(54) THREADED FASTENER HAVING A THREAD CREST GREATER THAN ITS THREAD ROOT

(76) Inventor: Gary Jack Reed, 2375 El Capitan Dr., Turlock, CA (US) 95380

( * ) Notice: Subject to any disclaimer, the term of this patent is extended or adjusted under 35 U.S.C. 154(b) by 0 days.

(21) Appl. No.: 09/478,930

(22) Filed: Jan. 6, 2000

(51) Int. Cl.$^7$ ............................... F16B 39/30
(52) U.S. Cl. ........................ 411/307; 411/411
(58) Field of Search ................. 411/307–311, 411, 411/423

(56) References Cited

U.S. PATENT DOCUMENTS

| | | | |
|---|---|---|---|
| 2,487,296 A | * 11/1949 | Bergstrom | 411/411 |
| 3,079,181 A | * 2/1963 | Van Der Wissel | 411/307 |
| 3,989,284 A | * 11/1976 | Blose | 411/411 |
| 4,351,626 A | * 9/1982 | Holmes | 411/411 |
| 4,600,224 A | * 7/1986 | Blose | 411/423 |
| 4,629,223 A | * 12/1986 | Dearden | 285/334 |
| 5,338,074 A | 8/1994 | Barringer et al. | |
| 5,360,240 A | 11/1994 | Mott | |
| 5,379,505 A | 1/1995 | Reed | |
| 5,415,442 A | 5/1995 | Klementich | |
| 5,417,532 A | 5/1995 | Reed | |
| 5,454,605 A | 10/1995 | Mott | |
| 5,499,892 A | 3/1996 | Reed | |

FOREIGN PATENT DOCUMENTS

| | | | | |
|---|---|---|---|---|
| GB | 137777 | * | 1/1920 | 411/423 |
| JP | 1224510 | * | 9/1989 | 411/307 |

* cited by examiner

Primary Examiner—Flemming Saether
(74) Attorney, Agent, or Firm—Bernhard Kreten

(57) ABSTRACT

A progressive (variable) pitch, interlocking thread with a tooth cross-section that is wider at its crest than at its root which creates radial clamping action when tightened into a tapped hole that has a similar thread cross-section.

19 Claims, 4 Drawing Sheets

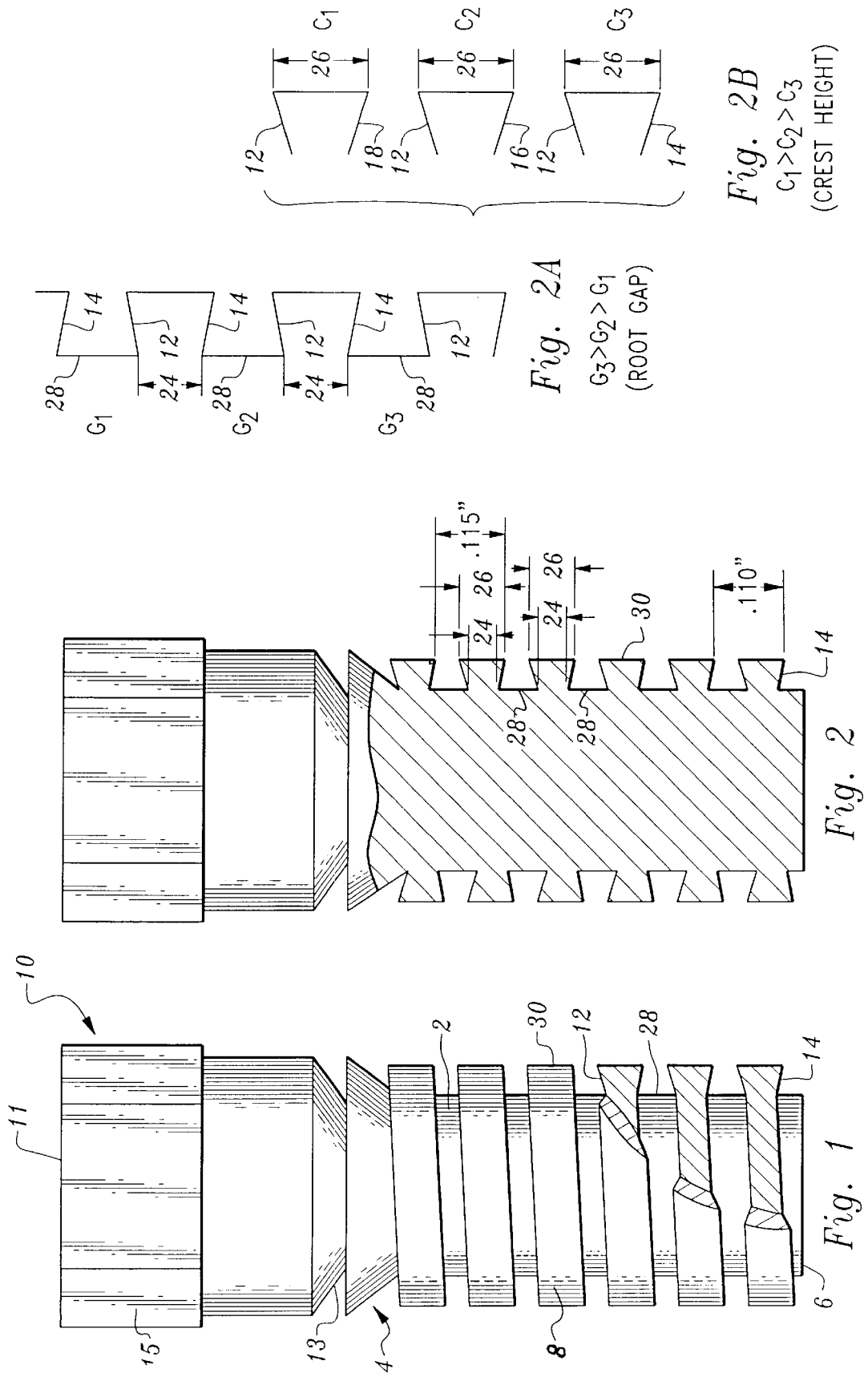

THREADED FASTENER HAVING A THREAD CREST GREATER THAN ITS THREAD ROOT

FIELD OF THE INVENTION

The following invention relates generally to fasteners. More particularly, this invention pertains to the field of fasteners having an exterior thread located peripherally about the shaft of the fastener, in which the thread spirals along a portion of the shaft. Most specifically, the thread, when taken in cross-section has a contour which increases in a dimension as it extends radially away from a root of the thread.

BACKGROUND OF THE INVENTION

Threaded fasteners are extremely old devices which exhibit superior holding properties over non-threaded fasteners primarily due to a higher coefficient of friction. This coefficient of friction is manifested along the inter-face of the threads to its connecting; environment. Fasteners where the threaded portion exhibits a dovetail when viewed in cross-section define one specie of threaded fastener.

The following patents reflect the state of the art of which applicant is aware and is included herewith to discharge applicant's avowed duty to disclose prior art. It is respectfully submitted, however, that none of these patents singly nor when combined in any conceivably permissible manner teach or render obvious the instant invention as set forth hereinafter.

| Pat. No. | ISSUE DATE | INVENTOR |
| --- | --- | --- |
| 5,338,074 | Aug. 16, 1994 | Barringer, et al. |
| 5,360,240 | Nov. 1, 1994 | Mott |
| 5,379,505 | Jan. 10, 1995 | Reed |
| 5,415,442 | May 16, 1995 | Klementich |
| 5,417,532 | May 23, 1995 | Reed |
| 5,454,605 | Oct. 3, 1995 | Mott |
| 5,499,892 | Mar. 19, 1996 | Reed |

While several of these patents teach the use of an element which appears to benefit from dovetail geometry, none provide interconnection between a threaded fastener and a correspondingly contoured bore in which the fastener meets with gradually increased resistance, providing an interference fit as the fastener becomes progressively engaged.

SUMMARY OF THE INVENTION

This invention is a new type of thread combination that has a special ability to self tighten while creating a radial clamping action. Normal straight threads do not have an ability to self tighten or an ability to clamp radially. Normal threads in fact create radial spreading force when tightened into a threaded bore or nut. This radial spreading force often overpowers the strength of the piece it is tightened into and causes the piece to crack. This is very common in cast iron and aluminum castings with tapped holes. The object of this invention is to provide a means wherein both of these limitations of normal threads are overcome. With this thread design applied to a tapered pipe lug and receiving hole in a casting, problems of over tightening the plug to obtain a seal which often results in a crack being formed in the side wall of the treaded hole will be eliminated.

The thread can also be applied to metal stitching pins used to repair cracked and damaged castings. One advantage over the prior art is that the old method which required a machined counterbore to be cut into the surface of the casting is eliminated. The present invention will make it much easier to repair thin wall castings that currently are very difficult to repair with hook thread style stitching pins.

The prior art also teaches crack repair utilizing either tapered threaded pins or straight threaded pins having a shoulder or abutment above the threads to halt the forward rotation of the pin thus causing it to tighten in the threaded bore. This new invention does not require either a shoulder or abutment.

The thread design in cross-section resembles that of an interlock wherein the thread cross-section of the crest or major outside surface of the thread tooth is wider than the cross-section of the root thread tooth. When installed into a similarly threaded bore, the interlock is perfected and clamping and radial drawing of the female threaded hole threads occurs, so that interlocking of the male screw threads and the female threaded bore threads are completed. This will have the effect of strengthening the threaded bore material as if there had not been a hole cut into it let alone the negative effect of having a standard, spreading fastener tightened into it. Reversal of the prior art spreading force will greatly increase the life of threaded holes which affects the life and serviceability of the part.

This invention utilizes a thread tooth profile that has the same side, root and crest surfaces parallel to each other but not necessarily to the length axis of the pin. It also uses a new concept of varying the pitch of either or both of the side flanks of the teeth. Changes to the pitch geometry of the threaded pin while maintaining a constant pitch within the threaded receiving hole by increasing either or both flank pitches can cause the threaded pin to be self-engaging as it is screwed into the receiving hole. This self-engagement will result in the threads of the pin being drawn deeper into the side wall of the threaded hole which when tightening occurs and, results in halting continued forward rotation (advancement) of the pin. The depth of installation can be controlled by slight changes to the width of the crest by changes to the pitch of upper and lower flanks of the thread teeth.

Different threaded products can be manufactured with predetermined effects based on desired outcome. Providing radial clamping force on certain threaded fasteners can have dramatic affects on the base material that they are threaded into. Spreading force causes cracks. Threaded holes that are too close to an edge are prone to cracking. Threaded holes in soft materials are prone to stripping. By using the present fastener, the forces engendered cause the material receiving the fastener to draw towards the fastener not away as in the prior art.

The instant invention is distinguished over the known prior art in a multiplicity of ways. As will be defined in the ensuing description of the preferred embodiment, the fastener is defined by a shaft or shank which may be cylindrical or tapered. A thread is spirally wound around the shaft. In section, the thread has a contour which diverges or bulges as it extends further outwardly from the shaft. Each section of the thread includes a root base, an upper flank and a lower flank which are girded on an outer exterior by a crest having a height. A root gap is interposed between adjacent teeth in line with the root base. The key to the instant invention involves the relationship of these various aspects of the fastener, one to the other and to its associated bore.

For example, assume the portion of the thread viewed in section appears as a dovetail. Each dovetail has an upper flank (nearer the fastener's driving head or "top") and a lower flank. These threads are spirally formed about a shaft of the fastener. The upper flank preferably has a constant pitch whereas the lower flank has a pitch which varies along the length of the thread. By pitch it is meant thread density per unit length of shaft. In actuality, with a thread which is "dovetail" in section, the thickness of the thread will vary. More particularly, it is preferred that the pitch of the lower flank decreases as it goes from a "bottom" or second (lower) end of the fastener to the "top" or first (upper) end of the fastener. By "bottom" it is meant an end of the shaft remote from a driving end. This means that the distance between adjacent, vertically aligned lower flanks of the thread increases as it moves from a bottom of the shaft to a top of the shaft. In this example, it is preferred that the upper flank's pitch is held constant.

Two geometrical corollaries are obtained from the foregoing example. First, the root gap of the shaft that extends between facing upper and lower flanks will correspondingly increase in dimension from the top to bottom as successive root gaps are viewed from a top most portion (or first end of the threaded shaft) to a lower most or second end of the threaded shaft. Note that while the root gap increases, the root base decreases from top to bottom.

Second, the crest height which is defined by the outer wall of the crest that exists between each upper flank and lower flank on any given dovetail section will decrease in dimension and gets measureably smaller as it descends from the first top end of the shaft to the second bottom end.

By having these variations in the dovetail thread geometry, the dovetail threaded fastener delivers an increasing frictional gradient with respect to a dovetail threaded bore into which is to be received. Preferably, the bore which is to receive the threaded fastener has a constant pitch for both the upper flank and the lower flank. Preferably, the lower flank of the bore is held constant at the same pitch as the upper flank of the threaded fastener. The upper and lower flank angles of both the bore and fastener preferably are also set at respective, complemental constant angles. As a direct consequence, the dovetail threaded fastener meets a relatively minimal resistance when first being inserted into the threaded bore, but the resistance to rotation ramps up as the threaded fastener is advanced into the threaded bore due solely to varying the pitch of the threaded fastener's lower flank. This results in substantially greater retention power.

The fastener according to the present invention enjoys particular utility in repairing cracks in cast material for example as evidenced by applicant's previous U.S. Pat. Nos. 5,417,532, 5,499,892 and 5,379,505. It has been found by applicant that the ability to withstand separation along a crack line is at least three times greater with the dovetailed fastener than by using the structure delineated in applicant's earlier patents. Nonetheless, the fastener exhibits similar performance enhancement in media other than cast metal, such as wood, metal, synthetics, etc.

In addition, the structure according to the present invention is appreciably stronger in retarding axial translation both of the fastener and the material within which the fastener is located. Further, the fastener has appreciably greater strength in resisting bending moments, resisting torsional flexure.

OBJECTS OF THE INVENTION

Accordingly, it is a primary object of the present invention to provide a new and novel fastener.

A further object of the present invention is to provide a device as characterized above which has a thread structure which when viewed in cross-section widens as it extends from a central shaft.

A further object of the present invention is to provide a device as characterized above which has greater resistance to axial forces, radial forces and bending moments.

A further object of the present invention is to provide a device as characterized as above which is to be received in a bore having a recess in which the geometry of the recess of the bore is substantially constant and does not vary as does the fastener.

A further object of the present invention is to provide a device as characterized above in which the variation in the thread geometry of the fastener allows initial easy starting of the threaded fastener into the associated bore and is subsequently followed by an increase in the rotating force required to incrementally advance the fastener.

A further object of the present invention is to provide a device as characterized above which is durable in construction, extremely safe to use and lends its self to mass production techniques.

Viewed from a first vantage point, it is an object of the present invention to provide a fastener, comprising in combination: a shaft having a first end including means to rotate the shaft, the shaft having a thread projecting from an outer periphery of the shaft and spiraling along its length, the thread defined by an upper flank, a lower flank, a root adjacent the shaft and a crest remote from the shaft, the thread defining a dovetail when viewed in section, the lower flank of the thread having a pitch which varies along the thread.

Viewed from a second vantage point, it is an object of the present invention to provide a fastener, comprising in combination: a shaft having a first end including means to rotate the shaft, the shaft having a thread projecting from an outer periphery of the shaft and spiraling along its length, the thread defined by an upper flank, a lower flank, a root adjacent the shaft and a crest remote from the shaft, the thread defining a dovetail when viewed in section, the crest having a crest height defined by an outer periphery subtended by one said upper flank and one said lower flank, where crest heights changes along the length of the thread.

Viewed from a third vantage point, it is an object of the present invention to provide a fastener, comprising in combination: a shaft having a first end including means to rotate said shaft, the shaft having a thread projecting from an outer periphery of the shaft and spiraling along its length, the thread dined by an upper flank, a lower flank, a root adjacent the shaft and a crest remote from the shaft, the thread defining a dovetail when viewed in section, the root having a root gap defined by facing upper and lower flanks, the root gap changes along the length of the thread.

These and other objects will, be made manifest, when considering the following detailed specification when taken in conjunction with the appended drawing figures.

BRIEF DESCRIPTION OF THE DRAWINGS

FIG. 1 is a plan view of the threaded fastener according to the present invention having certain threads cut-away to show the dovetail profile.

FIG. 2 is a sectional view of the same fastener.

FIG. 2A is an exact detail of the root gap shown in FIG. 2.

FIG. 2B is an exaggerated detail of the crest height shown in FIG. 2.

DESCRIPTION OF PREFERRED EMBODIMENTS

Figure 2C:
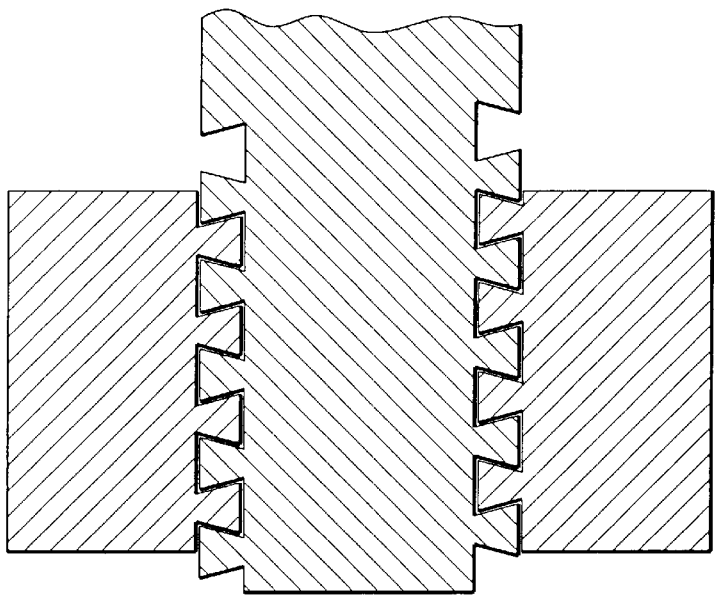
FIG. 2C shows the FIG. 2 fastener in a constant pitch tapped hole.

Considering the drawings, wherein like reference numerals denote like parts throughout the various drawing figures, reference numeral 10 is directed to the threaded fastener according to the present invention.

In general, the fastener 10 includes a shaft 2 preferably of substantially cylindrical configuration. The fastener 10 has a first end 4 adjacent a "top" thereof and a second end 6 defining a "bottom". Note that the use of terms such as "top", "bottom", "horizontal", etc. are made relative to the drawings appended herewith but are not intended to be directionally limiting.

In its essence, the invention resides in the ability to provide an interference fit between the fastener with its associated bore. In one specific embodiment the threads are dovetail in section, the fastener when tightened induces radially inward forces as well as compressive forces which provide a fastener of improved holding power. The degree of interference increases as the thread is advanced into the bore. Typically, starting the fastener into the bore is met with minimal resistance. Subsequently, as the fastener is advanced further into the bore, the resistance gradually increases in a programmed, controlled manner. The manner in which the resistance is controlled focuses, on the changes in dimension of the contacting surfaces that exist between the fastener and the bore. For example, FIG. 2 shows that the span between the two "lowest" lower flanks is 0.110; the span between the two "highest" lower flanks is 0.115. While the initial discussion focuses on the fastener and its changes in dimension, it is evident that parallel changes could be effected within the bore for similar results. In a preferred embodiment, only the dimensions of various components of either the fastener or the bore varies while the other is held constant.

Considering the fastener first, each fastener is provided with a central shank or shaft which includes an integrally formed thread spirally deployed thereabout. In one embodiment, any cross-section of the thread would appear as a dovetail having an upper flank on a top side thereof and a lower flank on a lower side thereof. The outer surface extending between the upper flank and lower flank defines a crest. The dovetail is supported on a shaft by the root. Areas on the shank or shaft between adjacent dovetails defines root gaps. Collectively, the shaft, upper flank, lower flank, crest, root and root gap define variable components whose dimension may vary from one end of the fastener to the other to provide the interference fit that is the key to this invention. Because the fastener is an integrally formed device made from solid stock, progressively varying the dimension of one of these variables frequently, if not always, affects one or more of the other variables.

The key, however, is that the change in one variable (of the fastener for example) is made relative to its associated bore in such a manner that the resistance that one variable experiences against its counterpart in the bore increases resistance as the fastener is axially advanced into the bore as such, providing a non-uniform loading on at least one of the flanks.

For example, as shown in FIGS. 1 and 2, the thread spirals about shaft 2 and is defined by a helical upper flank 12 and a helical lower flank 14. Upper and lower flanks define the upper and lower boundaries of the thread material. A root 24 initiates the thread material extending from shaft 2 while crest 30 having a height 26 defines an outermost thread extremity, terminating at an end of both upper flank 12 and lower flank 14. A gap 28 extends between adjacent vertically aligned roots 24.

FIGS. 2A and 2B exaggerate certain geometric structures of the thread. For example, in FIG. 2A, the lower flanks 14 have a pitch (or thread density per unit length of the fastener shaft) which varies as a function of the location of the lower flank vis-à-vis the top of the fastener 10. The pitch of the upper flank 12 is preferably constant. The angle of all the lower flanks 14 are parallel; the angle of all the upper flanks 12 are parallel as shown in the FIG. 2 section.

FIG. 2A details the root gap 28 which is measured between adjacent roots 24 of vertically aligned thread sections. This root gap G varies in dimension from the top to the bottom so that $G1<G2<G3$ etc. Note that modifying the dimension of the root gap 28 should also modify the dimension of root 24.

FIG. 2B also exaggerates the crest height 26 in which the height is measured between an upper flank 12 and a lower flank 14 on any given thread section. As shown in FIG. 2B, $C3<C2<C1$ etc.

FIG. 2C restores some perspective to FIGS. 2A and 2B. There shown is a tapped hole having a constant pitch. The fastener 10 has a constant upper flank pitch, variable crest width (increasing from bottom to top), a variable root width (decreasing from bottom to top) and a variable pitch of the lower flank.

Thus, the changing pitch of the lower flank is caused by varying the dimension of the root gap and the crest height. Similarly, the lower flank pitch could be held constant while increasing the pitch of the upper flank from bottom to top of the fastener. This can also be caused by varying both the root gap dimension and the crest height dimension (as discussed with the lower flank example). In effect, the height of the crest is the preferred variable to be controlled. Alternatively, the gap G at the root, when varied can also change the interference fit. Because all upper flanks (and preferably the lower flanks) are to remain parallel, both the gap G and crest height C should change. If only one changed, the flanks would not remain parallel.

Figure 3:
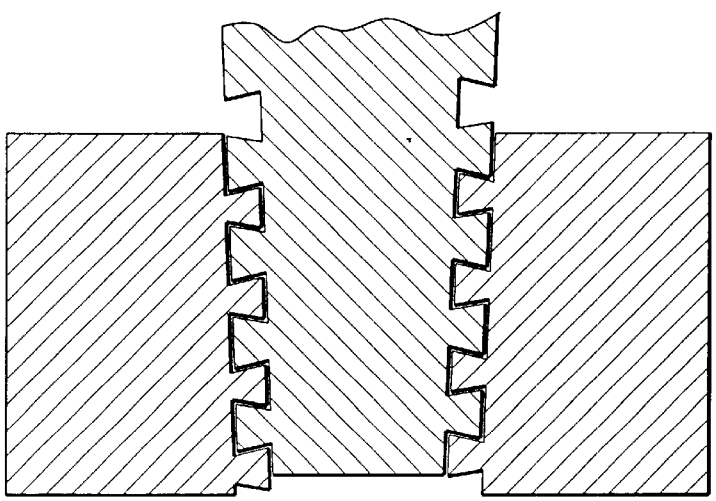
FIG. 3 is a sectional view of a fastener and bore which tapers, narrowing downwardly.

A further manner of increasing the resistance (interference) involves tapering the hole as well as the fastener. As shown in FIG. 3 both hole and fastener display a variable pitch. In effect, as the shaft or shank tapers down from top (head) to bottom, friction increases as the fastener is advanced in a bore.

Figure 4:
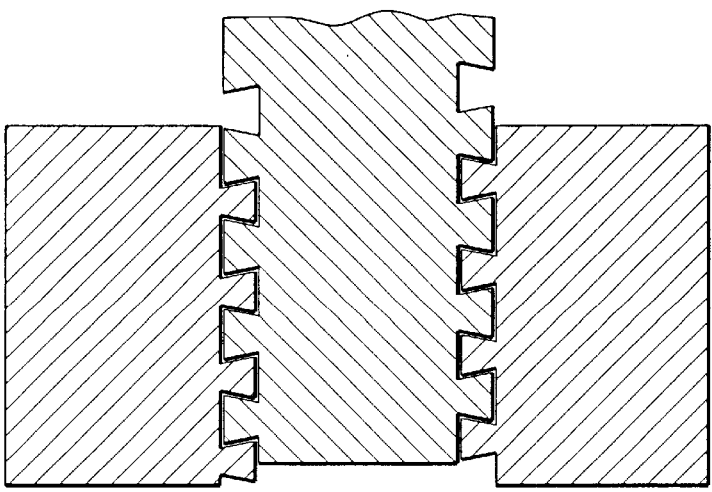
FIG. 4 is a sectional view of a fastener and tapped bore both having variable pitch.

FIG. 4 shows a tapped hole and threaded fastener in which both have been provided with variable pitch.

Figure 5:
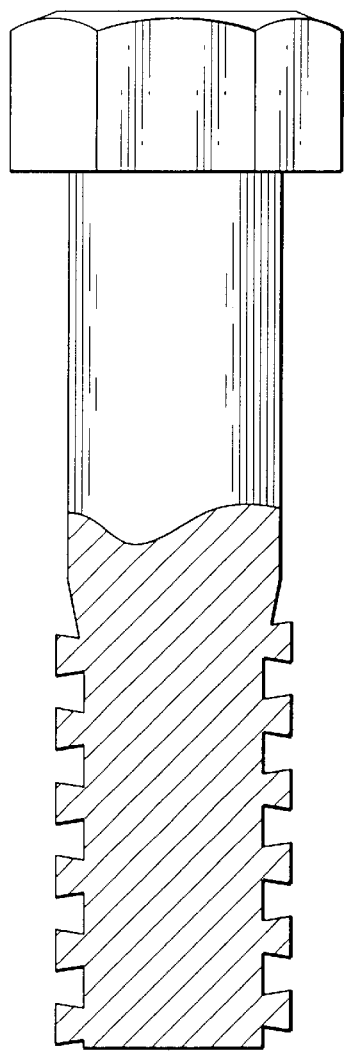
FIG. 5 depicts another variation in which a bolt has been provided with the dovetail threads.

FIG. 5 depicts a bolt provided with threads of the present invention.

Figure 6:
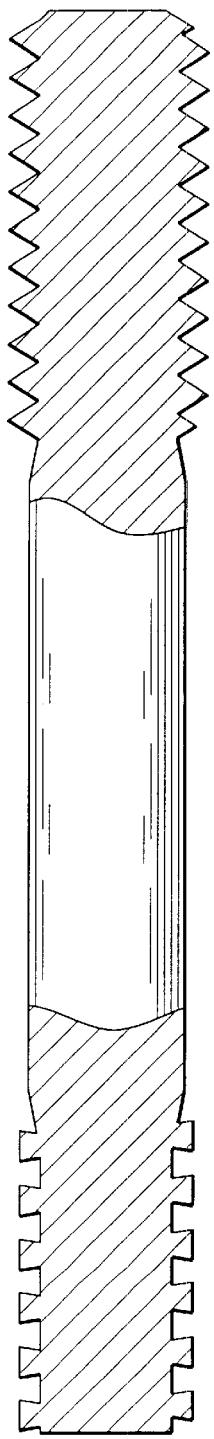
FIG. 6 is a detail of a stud having non-standard threads on one end and standard threads on an opposite end.
Figure 7:
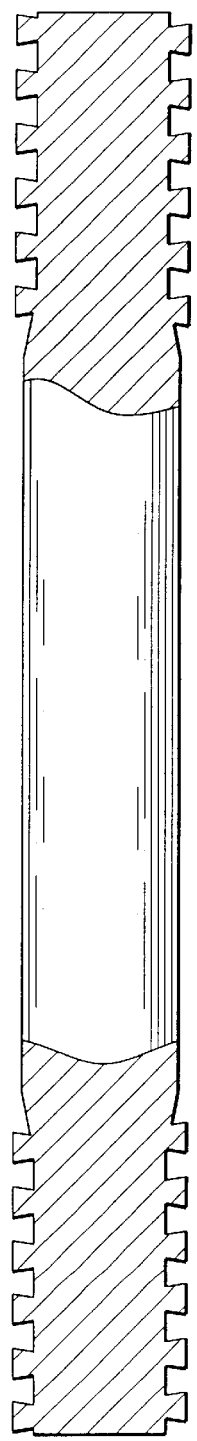
FIG. 7 is a detail of a stud having non-standard threads on both ends.

FIG. 6 teaches a threaded stud having conventional threads on one end and the threads of the present invention at the other end. FIG. 7 shows the novel threads at both ends.

Figure 8:
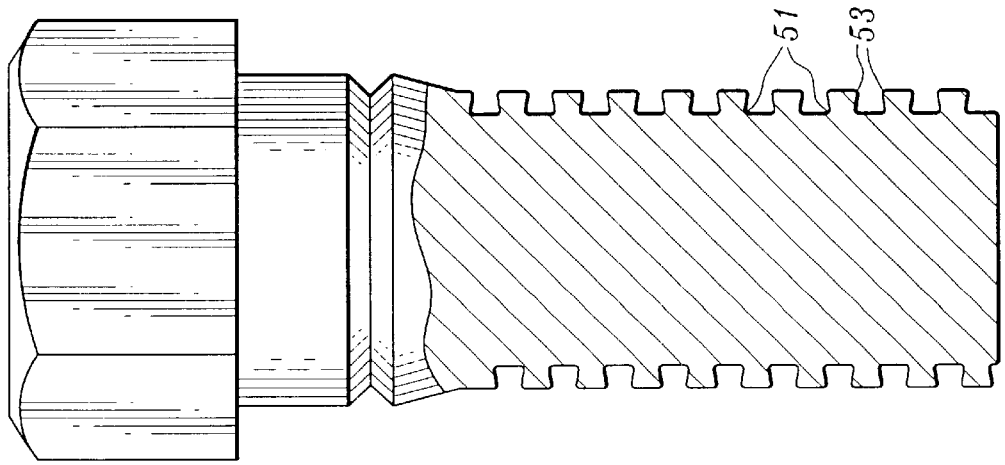
FIG. 8 is a sectional view of an alternative.

FIG. 8 reflects a variation of FIG. 2 for example. Whereas in FIG. 2 the intersection of flanks, crests and gaps presented sharp angles, FIG. 8 shows radiused areas: 51 between the gap 28 and each flank 12, 14, and 53 between each flank 12, 14 and crest 30.

Figure 9:
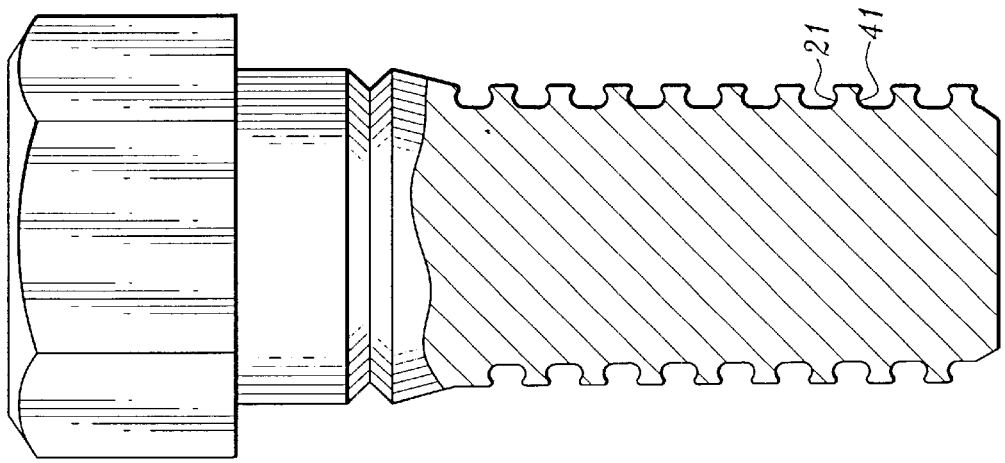
FIG. 9 is a sectional view of an alternative to FIG. 8.

FIG. 9 is similar to FIG. 8 but that whereas flank 12, 14 are planar (FIG. 8), the flanks 21, 41 in FIG. 9 are curved.

Figure 10:
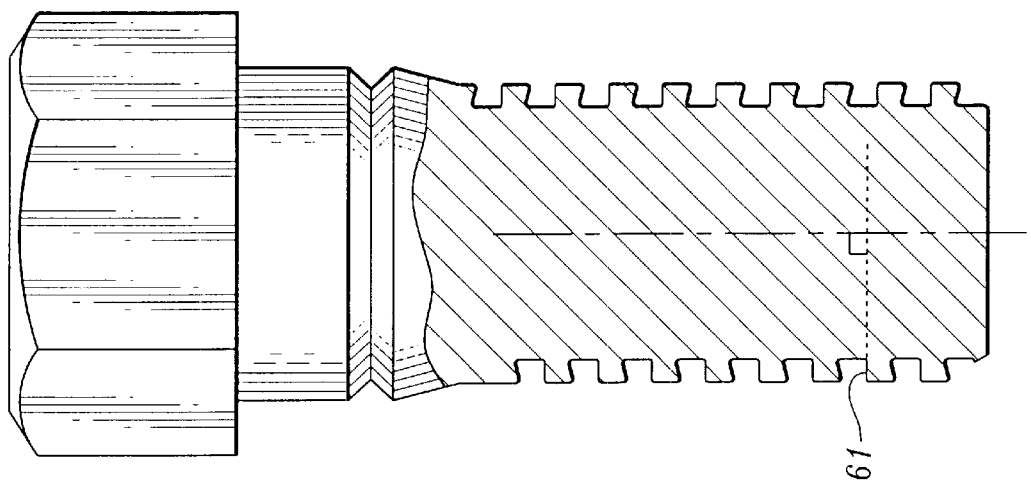
FIG. 10 is a sectional view of an alternative to FIGS. 8 and 9.

FIG. 10 is similar to FIGS. 9 and 8 except that one flank is substantially horizontal, as shown, upper flank 61 is substantially perpendicular to the long axis of the fastener. The other flank can be as shown in FIGS. 10, 9, 8, 2; etc. The area of commonality is that the root 24 in all cases has a lesser dimension than the crest 30 height 26.

I claim:

1. A fastener, comprising, in combination:

a shaft having a first end including means to rotate said shaft, said shaft having a thread projecting from an outer periphery of said shaft and spiraling along its length, said thread defined by an upper flank, a lower flank, a root adjacent said shaft and a crest remote from said shaft, said thread defining a dovetail when viewed in section such that said upper and lower flank of one dove tail section diverge outwardly from each other away from said root, said fastener received within a bore having a general contour complemental to said fastener, said lower flank of said thread having a pitch which varies along said thread, said upper flank of said thread having a pitch which does not vary along said thread whereby non-uniform loading occurs on at least one said flank.

2. The fastener of claim 1 wherein said lower flank pitch of said fastener increases as it moves away from said first end.

3. A fastener, comprising, in combination:

a shaft having a first end including means to rotate said shaft, said shaft having a thread projecting from an outer periphery of said shaft and spiraling along its length, said thread defined by an upper flank, a lower flank, a root adjacent said shaft and a crest remote from said shaft, said thread defining a dovetail when viewed in section, said fastener received within a bore having a general contour complemental to said fastener, said crest having a crest thickness defined by an outer periphery subtended by one said upper flank and one said lower flank, where crest thicknesses change along the length of said thread and a pitch of one said flank is held constant whereby non-uniform loading occurs on at least one of said flanks.

4. The fastener of claim 3 wherein said crest thickness of said fastener decreases as it moves away from said first end.

5. A fastener, comprising, in combination:

a shaft having a first end including means to rotate said shaft, said shaft having a thread projecting from an outer periphery of said shaft and spiraling along its length, said thread defined in section by an upper flank, a lower flank, a root adjacent said shaft and a crest remote from said shaft, said thread defining a dovetail when viewed in section, said fastener received within a bore having a general contour complemental to said fastener, said root having a root gap defined by facing upper and lower flanks, said root gap changes along the length of said thread and a pitch of one said flank is held constant whereby non-uniform loading occurs on at least one of said flanks.

6. The fastener of claim 5 wherein said root gap increases as it moves away from said first end.

7. A fastener, comprising, in combination:

a shaft having a first end including means to rotate said shaft, said shaft having a thread projecting from an outer periphery of said shaft and spiraling along its length, said thread defined in section by an upper flank, a lower flank, a root adjacent said shaft and a crest remote from said shaft, a thread cross-section that is wider at said crest than said root, said fastener received within a bore having a general contour complemental to said fastener, and increasing interference fit means between said bore and fastener as said fastener advances into said bore defined by only one upper or lower flank of either said bore or said shaft thread having a varying thread pitch and the remaining flanks a constant pitch whereby non-uniform loading occurs on at least one of said flanks.

8. A fastener having a thread spiraling along a length of said fastener, comprising, in combination:

a cross-section of said fastener thread having a dovetail shape with a first flank and a second flank, a crest connecting extremities of said first and second flanks to enclose and define thread material therebetween which extends from a fastener shaft through a thread root, said spiraling thread when taken in section along a length of said fastener, said fastener received within a bore having a general contour complemental to said fastener having a series of vertically aligned said first and second flanks, wherein a pitch density of said first flank is constant along the length while a pitch density of said second flank is not constant along the length whereby non-uniform loading occurs on at least one of said flanks.

9. The fastener of claim 8 wherein a distance between adjacent second flanks progressively increases to provide a progressively increasing interference fit.

10. The fastener of claim 8 wherein said fastener has a shaft from which said thread extends, and said shaft has a taper along its length.

11. The fastener of claim 8 wherein said fastener is embodied as a bolt.

12. The fastener of claim 8 wherein said fastener is embodied as a stud.

13. The fastener of claim 12 wherein two ends of said stud have said dovetail thread.

14. The fastener of claim 8 wherein a transition between each said flank and said root is radiused.

15. The fastener of claim 8 wherein a transition between said flank and said crest is radiused.

16. The fastener of claim 8 wherein each said flank is radiused.

17. The fastener of claim 8 wherein one said flank is oriented at right angles to a long axis of said fastener.

18. A bore for a threaded fastener, comprising, in combination:

said bore formed with dovetail threads complemental to dovetail threads of said fastener including first and second thread flanks, said first flank of said fastener having a constant pitch, said second flank of said fastener having a constant pitch, said first flank of said bore having a constant pitch, said second flank of said bore having a pitch which is not constant non-uniform loading occurs on at least one of said flanks.

19. A bore for a threaded fastener, comprising, in combination:

said bore formed with dovetail threads substantially complemental to dovetail threads of said fastener both having first and second flanks, said first flank of said fastener having a constant pitch, said second flank of said fastener having a pitch which is not constant, said first flank of said bore having a constant pitch, and said second flank of said bore having a constant pitch whereby non-uniform loading occurs on at least one of said flanks.

* * * * *